(12) United States Patent
Descombes

(10) Patent No.: US 8,244,252 B2
(45) Date of Patent: Aug. 14, 2012

(54) METHOD FOR ACTIVATING A NETWORK-BASED SERVICE IN A COMMUNICATION NETWORK, APPARATUS, DEVICE AND NETWORK THEREFORE

(75) Inventor: Pierre-Yves Descombes, Annecy-le-vieux (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1135 days.

(21) Appl. No.: 11/722,843

(22) PCT Filed: Jan. 13, 2006

(86) PCT No.: PCT/EP2006/050202
§ 371 (c)(1),
(2), (4) Date: Feb. 6, 2008

(87) PCT Pub. No.: WO2006/077199
PCT Pub. Date: Jul. 27, 2006

(65) Prior Publication Data
US 2008/0261566 A1    Oct. 23, 2008

(30) Foreign Application Priority Data
Jan. 21, 2005   (EP) .................................. 05300051

(51) Int. Cl.
| H04W 36/00 | (2009.01) |
| H04W 36/36 | (2009.01) |
| H04W 40/00 | (2009.01) |
| H04M 3/42  | (2006.01) |
| H04M 1/00  | (2006.01) |
| H04B 7/00  | (2006.01) |

(52) U.S. Cl. ........ 455/437; 455/436; 455/439; 455/448; 455/517; 455/414.1; 455/552.1

(58) Field of Classification Search .......... 455/517–520, 455/459, 461, 552.1–553.1, 436–444
See application file for complete search history.

(56) References Cited

U.S. PATENT DOCUMENTS

| 5,809,018 | A  | * | 9/1998  | Lehmusto .................... 370/330 |
| 6,321,096 | B2 | * | 11/2001 | Lautenschlager et al. .... 455/461 |
| 6,493,431 | B1 |   | 12/2002 | Troen-Krasnow et al. |
| 6,657,990 | B1 |   | 12/2003 | Dilip et al. |
| 7,054,302 | B2 | * | 5/2006  | Albal et al. ................... 370/347 |
| 7,289,816 | B2 | * | 10/2007 | Mills ............................. 455/458 |
| 7,548,758 | B2 | * | 6/2009  | Periyalwar et al. .......... 455/517 |
| 7,751,432 | B2 | * | 7/2010  | Martin et al. ................. 370/466 |
| 7,813,484 | B2 | * | 10/2010 | Jackson et al. ............. 379/88.13 |
| 2002/0006801 | A1 | * | 1/2002  | Siren ............................. 455/461 |
| 2002/0132635 | A1 | * | 9/2002  | Girard et al. ................. 455/552 |
| 2003/0050051 | A1 |   | 3/2003  | Vilander |
| 2003/0090998 | A1 | * | 5/2003  | Lee et al. ...................... 370/229 |
| 2003/0095654 | A1 | * | 5/2003  | Shibao .................... 379/373.01 |
| 2003/0233399 | A1 |   | 12/2003 | Prohel et al. |
| 2004/0260819 | A1 |   | 12/2004 | Trossen |
| 2005/0027716 | A1 | * | 2/2005  | Apfel ............................ 707/100 |
| 2005/0054375 | A1 | * | 3/2005  | Patel et al. ................. 455/552.1 |
| 2005/0078627 | A1 | * | 4/2005  | Yoon et al. .................... 370/328 |
| 2005/0197101 | A1 | * | 9/2005  | Gupta ........................... 455/410 |

(Continued)

Primary Examiner — Matthew Sams

(57) ABSTRACT

According to one aspect of the present invention, there is provided apparatus, in a communication network, for processing a request to initiate a communication using a first communication system, the request including information relating to one or more parties with which the communication is intended to be initiated, comprising: processing logic for determining whether the request includes information relating to a predetermined party, and where it is so determined, initiating a service in accordance with the information relating to the predetermined party.

27 Claims, 2 Drawing Sheets

U.S. PATENT DOCUMENTS

| | | | |
|---|---|---|---|
| 2005/0232220 A1* | 10/2005 | Evans | 370/349 |
| 2006/0031368 A1* | 2/2006 | deCone | 709/207 |
| 2006/0040683 A1* | 2/2006 | Lappalainen et al. | 455/466 |
| 2006/0111134 A1* | 5/2006 | Mills | 455/518 |
| 2007/0004438 A1* | 1/2007 | Brusilovsky et al. | 455/518 |
| 2007/0019656 A1* | 1/2007 | Martin et al. | 370/401 |

\* cited by examiner

METHOD FOR ACTIVATING A NETWORK-BASED SERVICE IN A COMMUNICATION NETWORK, APPARATUS, DEVICE AND NETWORK THEREFORE

BACKGROUND

As communication devices, such as mobile telephones, and communication networks become increasingly sophisticated there are an increasing number of communication services being offered to consumers. Examples of such communication services include instant messaging, push-to-talk, presence systems, voice clipping, and the like.

However, whenever a new communications service is developed there is typically a significant delay before the enabling technology finds its way onto consumer communication devices. This situation is further compounded since network operators are typically unwilling to invest in new services until consumers are able to use such services, and consumers are generally unwilling to purchase new communication devices supporting new communication services until such services are provided by the network operator. During this time, network operators are unable to generate significant revenue from such services, and at the same time, often significant numbers of consumers are unable to benefit from such services.

A recent example of such a situation is that of push-to-talk (PTT) which is a communications service available predominantly from mobile telephones. Push-to-talk is a voice over Internet protocol (VoIP) technology which enables voice messages to be exchanged between members of a group in substantially real-time. Push-to-talk provides half-duplex communications, with the user experience being similar to that provided by conventional citizens band (CB) radio and walkie-talkies.

Use of push-to-talk requires both a suitable PTT client application to be installed and running on a communication device handset, and a suitable PTT server to be provided by the network operator.

As far as mobile telephone handsets are concerned, there are two primary ways in which a PTT client application can be included thereon. On recent so-called smartphones, such as, for example, those handset executing the Symbian Series 60 operating system, a PTT client application may be downloaded to the handset and executed much like a software application may be downloaded and executed on a personal computing device such as a personal computer.

Many non-smart phones, however, are designed to have a fixed operating environment which is typically fixed during manufacture. Thus typically the only way for a mobile phone owner to obtain a PTT client application on their mobile phone is to buy a new mobile phone, or to have the existing phone reprogrammed. Reprogramming to add a PTT client application, however, may not be possible if the mobile phone, for example, does not have sufficient hardware resources, such as memory, processing power, etc. Furthermore, reprogramming typically can only be performed at authorised service centres by trained personnel and generally will involve the customer having to physically take their mobile phone to the service centre, and may also require payment of an administration fee. Furthermore, the provision of such service centres for reprogramming purposes represents a significant overhead to the mobile phone manufacturers. Consequently, many mobile phone owners may decide not to opt for reprogramming.

The emergence of PTT client applications on communication device handsets is expected to follow a path similar to that taken by SMS client applications when SMS services were first launched. So although currently only few mobile phones have PTT client applications installed as standard, in a few years it is expected that the majority of mobile phones will come with PTT client applications installed as standard.

However, whilst it seems likely now that PTT client applications will shortly be available as standard on the majority of new mobile phones, the deployment of other new communication services is hindered by similar problems to those experienced by PTT. One notable problem is the long lapse of time between the development of a new communication service and the emergence of communication device handsets having suitable client applications for enabling use of the new communication service. Such problems are detrimental to consumers, handset manufacturers and network operators alike.

SUMMARY

Accordingly, one aim of the present invention is to overcome, or at least alleviate, at least some of the above-mentioned problems.

According to a first aspect of the present invention, there is provided apparatus, in a communication network, for processing a request to initiate a communication using a first communication system. The request includes information relating to one or more parties with which the communication is intended to be initiated, and the apparatus comprises processing logic for determining whether the request includes information relating to a predetermined party. If it is so determined, the processing logic initiates a service in accordance with the information relating to the predetermined party.

Advantageously this enables services to be initiated, activated or otherwise accessed, through existing communication initiation mechanisms.

Preferably the processing logic is arranged to initiate the service in place of initiating the communication using the first communication system.

Suitably, the processing logic is arranged, where it is determined that the request does include information relating to a predetermined party, to respond to the request ending the initiation of the communication using the first communication system.

Suitably, the initiation of the service initiates a communication using a second communication system.

Suitably, the processing logic is arranged to initiate the communication using the second communication system using information included in the request.

The request may be suitably received from a communication device.

The processing logic may be arranged, where it is determined that the request does not include information relating to a predetermined party, to initiate a communication using the first communication system.

A communication server may be provided for providing the service.

Suitably, the processing logic is configured to obtain information required by the communication server and to supply the obtained information to the communication server to enable the communication server to initiate the service.

The first communication system may be a push-to-talk type system.

The request to initiate a communication using a first communication system may be a request to initiate a push-to-talk communication.

The information relating to one or more parties may include one or more buddy identifiers.

Suitably, the predetermined party is a buddy representing the communication server.

The second communication system may be a conventional telephony system, in which case the communication using the second communication system is a telephone call.

According to a second aspect of the present invention, there is provided a method, in a telecommunication network, of processing a request to initiate a communication using a first communication system, the request including information relating to one or more parties with which the communication is intended to be initiated. The method comprises determining whether the request includes information relating to a predetermined party, and where it is so determined, initiating a service in accordance with the information relating to the predetermined party.

The step of initiating the communication using the second communication system is preferably performed in place of initiating the communication using the first communication system.

Where it is determined that the request does include information relating to a predetermined party the method further includes responding to the request ending the initiation of the communication using the first communication system.

The step of initiating a service may further comprise initiating a communication using a second communication system.

The step of initiating the communication may further comprise initiating the communication using the second communication system using information included in the request Suitably the method includes receiving the request from a communication device.

Where it is determined that the request does not include information relating to a predetermined party, the method may further comprise initiating a communication using the first communication system.

The telecommunications network may further including a communication server for initiating the communication using the second communication system, in which case the method may further comprise obtaining information required by the communication server and supplying the obtained information to the communication server to thereby enable the communication server to initiate the service.

Suitably the method is adapted for use for where the first communication system is a push-to-talk type system, in which case the step of receiving a request may be adapted for receiving a request to initiate a push-to-talk communication.

The request may include one or more buddy identifiers in which case the step of determining may be adapted for determining the presence of a predetermined buddy identifier.

Suitably, the second communication system may be a conventional telephony system, in which case the step of initiating a communication using the second communication may be adapted to initiate a telephone call.

According to a third aspect of the present invention, there is provided a method, in a communication device having an interface operable for initiating a network-based service. The method comprises initiating, through the interface, a communication using the first communication system, the initiation including information relating to a predetermined party representing a service to be activated, the inclusion of the information relating to the predetermined party in the initiation being sufficient to cause the network to initiate the service.

Suitably, the initiation of the service causes the network to initiate a communication, using a second communication system, with the communication device.

According to a fourth aspect of the present invention, there is provided a communication device for use with a communication network, the communication device including an interface operable for initiating a communication with a first communication system, wherein the interface is arranged to send an initiation to the network, the initiation comprising information relating to a predetermined party, the inclusion of the predetermined party being sufficient to cause the network to activate a communication service.

According to a fifth aspect of the present invention, there is provided a method, in a communication system, of initiating a communication using a first communication system using a communication device, the communication device having an interface operable with a first communication system for initiating a communication. The method comprises initiating, through the interface, a communication using the first communication system, the initiation including information relating to a predetermined party; and determining whether the initiation includes the predetermined party, and where it is so determined, activating a service in accordance with the information relating to the predetermined party.

Suitably, the step of determining is adapted for being performed in a communication network.

According to sixth aspect of the present invention, there is provided a communication network comprising apparatus as described above.

According to a seventh aspect of the present invention, there is provided a communication network operating in accordance with any above described method steps.

According to an eighth aspect of the present invention, there is provided a communication device operable in accordance with any of the method steps or communication networks described above.

BRIEF DESCRIPTION OF THE DRAWINGS

Embodiments of the present invention will now be described, by way of example only, with reference to the accompanying drawings, in which.

DETAILED DESCRIPTION

Figure 1:
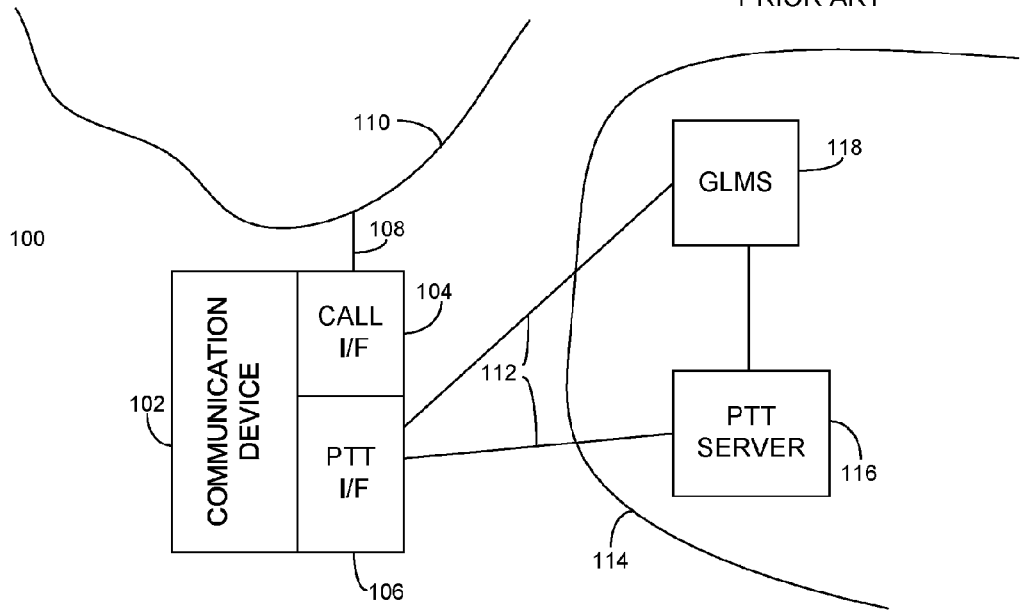
FIG. 1 is a block diagram of a system 100 according to the prior art.

Referring now to FIG. 1, there is shown a block diagram of a communication system 100 according to the prior art. A communication device 102, such as a mobile telephone handset or other suitable device or communication terminal, has a number of interfaces 104 and 106. The interface 104 enables a user of the communication device 102 to make and receive telephone calls over a conventional telephony network 110, such as a mobile telephony network, in a generally known manner. The interface 104 is provided by a suitable client application supplied by the manufacturer of the communication device 102.

The communication device 102 also has a push-to-talk interface 106 which is provided by a suitable push-to-talk client application. The push-to-talk client application may be provided by the manufacturer of the device, or may, if the communication device is suitable, be downloaded or otherwise installed on the communication device 102. The push-to-talk interface 106 enables the user of the communication device 102 to establish, receive and control push-to-talk communications, again in a generally known manner, over a data network 114.

The data network 114 includes a PTT server 116, such as a push-to-talk over cellular (PoC) server, which controls and manages push-to-talk communications on the network 114. Also provided is a group and list management server (GLMS) 118 which enables users to perform a variety of contact management functions, such as managing contact lists, contact groups, access lists, and the like, as will be appreciated by those skilled in the art.

The PTT interface 106, in conjunction with the GLMS 118, enables the user of the communication device 102 to display one or more so-called buddy lists on the screen (not shown) of the communication device 102. A buddy list is essentially a list of one or more contacts, like entries in an electronic address book, often enriched with additional information such as a dynamic presence status.

A buddy or entry in a buddy list comprises information capable of identifying a party with whom a communication may be established. In the simplest form, a buddy may comprise a textual identifier, such as the name of the party. For example, a buddy entry "Joe Public" may be used to establish a communication with the person Joe Public. Typically, addressing information detailing how the person Joe Public may be contacted is suitably held in the GLMS 118. For example, Joe Public may be contactable via a communication device having a known telephone subscriber number, and may also be contactable via a known SIP URI.

Buddies can be grouped, using the GLMS, facilitating the initiating of group communications using group communication technologies such as push-to-talk and instant messaging. For example, a buddy in a buddy list may also be a textual identifier representing a predetermined group of users. For example, the buddy entry "Chess Club" may be used to represent all members of the user's chess club, as defined through the GLMS by the user.

Alternatively, a buddy may comprise additional addressing information, such as SIP URI, telephone subscriber number, and the like.

When the user of the communication device 102 wishes to initiate a group communication using, for instance, PTT, the user selects, using the interface 106, one or more buddies, from a buddy list. Through the user interface 106, the user initiates the communication, typically by actuating an appropriate key or soft-key on the communication device 102.

The communication device 102 sends a PTT call setup message, such as a suitable session initiation protocol (SIP) Invite message, containing information relating to each of the buddies invited to the communication, to the PTT server 116. The PTT server 116 obtains, from the GLMS 118, addressing details of all of the buddies invited to the communication. Where an invited buddy includes a buddy representing a group of buddies, addressing details of each of the buddies represented are obtained.

The PTT server 116 then distributes corresponding individual call set up messages to each of the invited buddies, and once one or more of these messages are acknowledged, a PTT communication session is established in the conventional manner.

Figure 2:
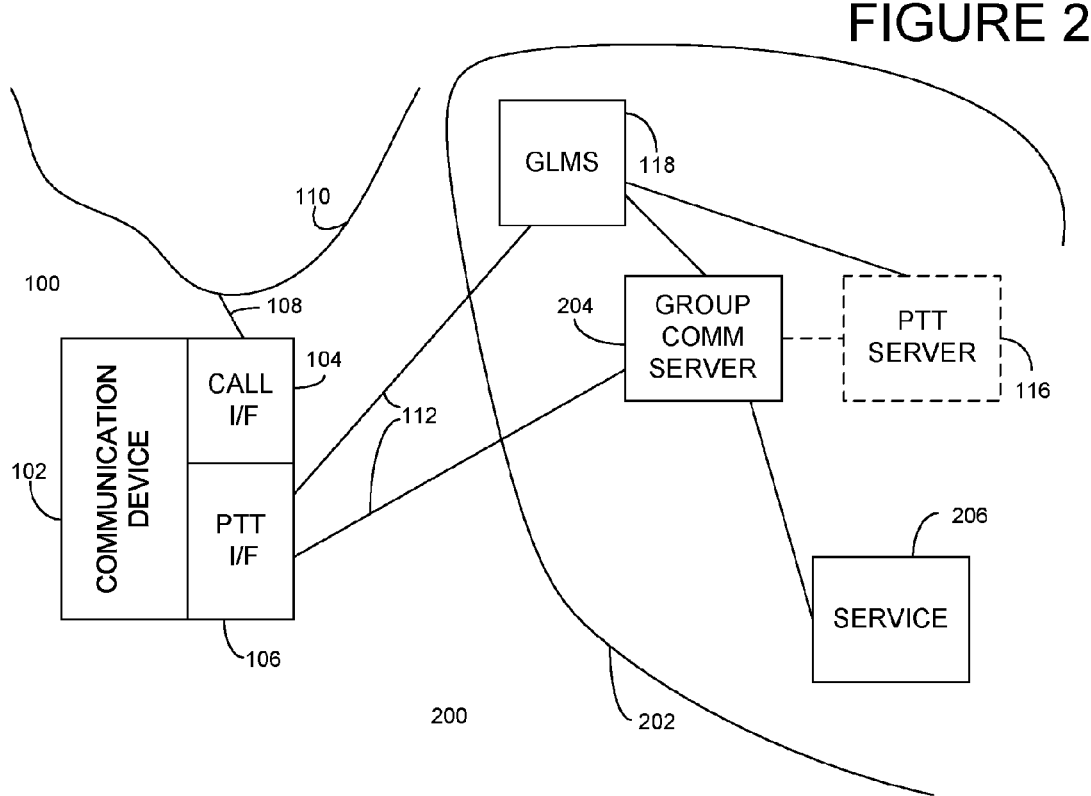
FIG. 2 is a block diagram of a system 200 according to an embodiment of the present invention.

Referring now to FIG. 2, there is shown a block diagram of a system 200 according to an embodiment of the present invention. The system 200 of FIG. 2 is similar in nature to the system 100 of FIG. 1, and accordingly like reference numerals indicate like elements. It should be noted that in the present embodiment, advantageously, the communication device 102 is a conventional communication device. It should also be noted that the PTT server 116 in the network 202 is optional, as will be described further below.

The present embodiment enables the introduction of new communication services in a simple and quick manner. In the present embodiment this is achieved by enabling new services to be used or accessed via the existing interface provided by the PTT interface 106.

By way of example, a new service, such as a communication service 206, is developed and is provided by the operator of the network 202. In the past, in order for users of the communication device 102 to be able to use the service 106 would have required a corresponding client application installed on the communication device 102, as described above. However, by way of the present embodiment, a user of the communication device 102 can use the service 206 almost as soon as the service becomes available, without requiring a specific corresponding client application to be installed on the communication device 102.

In the following example the service provided by the communication service 206 is a so-called voice clipping or voice messaging service. Such a service is intended to enable users of compatible communication devices to be able to send quasi-instantaneous voice messages to each other, much in the way that current mobile phones enable short message system (SMS) text messages to be sent and received.

Once the operator of network 202 makes the service 206 available it inserts, in a buddy list accessible by the communication device 102, a buddy representing the service 206. The network operator may achieve this by updating, through the GLMS 118, the buddy lists of subscribers to the new service.

Thereafter, if the user of the communication device 102 wishes to invoke or activate the service 206, he simply, using the PTT interface 106 in the conventional manner, selects one or more buddies with which to invoke the service, and additionally selects the buddy representing the service 206.

In the case of a voice clip service, the user initiates the voice clip service by actuating a suitable button on the communication device 102 and, whilst depressing the button, records a voice message which is to be sent as a voice clip to the selected buddies.

Figure 3:
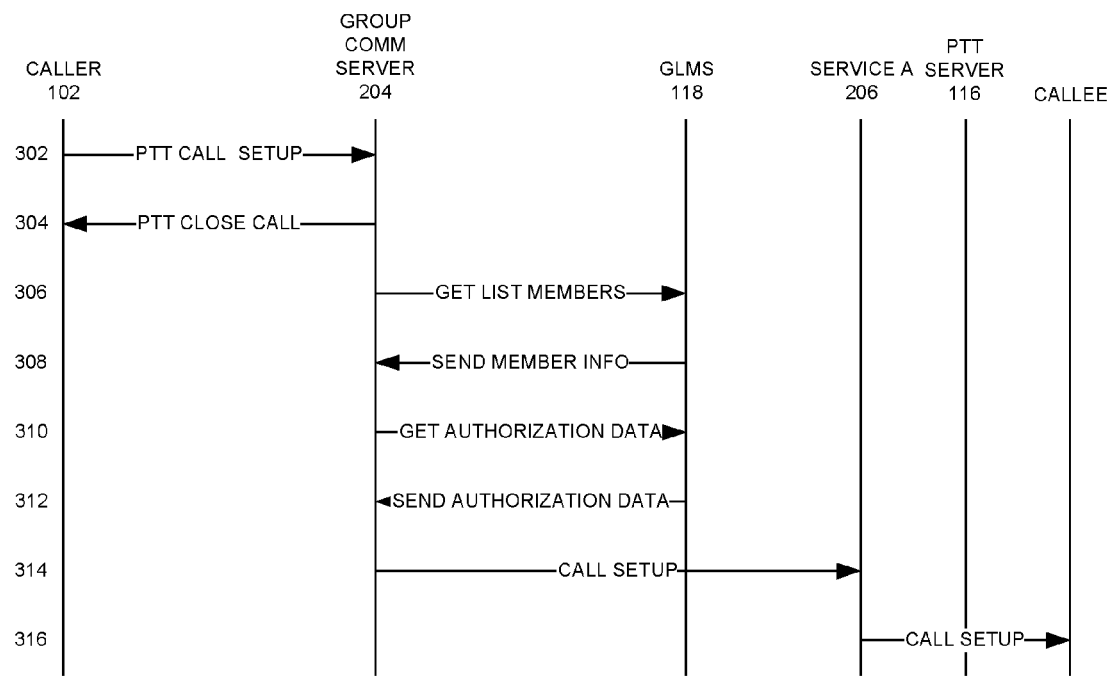
FIG. 3 is a message flow diagram outlining example messages which may be exchanged between different elements of the system 200 of FIG. 2.

Additional reference is made below to FIG. 3, which is a message flow diagram outlining example messages which may be exchanged between different elements of the system 200 of FIG. 2. Those skilled in the art will appreciate that the messages shown in FIG. 3 do not necessarily relate to any particular messages of any particular communication protocol, but are intended, rather, to indicate the type or nature of information communicated.

As described with reference to FIG. 1, the communication device 102 sends a PTT call setup message, 302, such as a SIP Invite message including information relating to each of the invited buddies to the network 202. The PTT call setup message 302 may also include an audio representation of the voice clip recorded by the user, or alternatively the voice message may be sent to a group communication server 204 (a computer) in one or more separate or subsequent messages or exchanges. In this case however, the PTT call setup message 302 is not sent to the push-to-talk server 116, but is sent to the group communication server 204. The address of the group communication server 204 may be suitably configured in the communication device 102. Alternatively, the group communication server 204 may be arranged to intercept all messages intended for the PTT server 116.

The group communication server 204 determines, for example through use of appropriate processing logic, whether the received PTT call setup message 302 includes information relating to a predetermined buddy representing the service 206. This may be achieved, for example, by ensuring that the buddy entry representing the service 206 is substantially unique, or includes a substantially unique identifier.

If the group communication server 204 determines that the received PTT call setup message 302 does not contain details of the buddy representing the service 206 a number of actions may be taken. For example, if the network 202 includes a PTT server 116, the group communication server 204 forwards the PTT call setup request 302 to the PTT server 116, and the PTT call setup is completed in the conventional manner. If, however, there is no PTT server provided in the network 202, the group communication server 204 returns a PTT close call message 304 to the communication device 102.

In the present example the group communication server 204 determines that the PTT call setup message 302 includes information relating to a predetermined buddy representing the voice clipping service 206. The group communication server 204 thereby determines that the PTT call setup message 302 is not intended to create a push-to-talk communication, but rather is intended to cause the service identified by the predetermined buddy to be invoked, executed or accessed. Accordingly, the group communication server 204 closes the PTT call initiated by the communication device 102 by responding with a PTT close call message 304.

By recognizing the presence of information relating to a predetermined buddy representing the service 206 in the PTT call setup message 302, the group communication server 204 identifies that the service requested by the user of the communication device 102 is the voice clipping service 206. The group communication server 204 is configured to know that the voice clipping service 206 requires, for example, a SIP address for each buddy included in the PTT call setup message, apart from, of course, for the buddy representing the service 206.

The group communication server 204 sends a Get List Members message 306 to the GLMS to obtain the required details of all of the buddies included in the PTT call setup message. As described above, if one of the buddy entries represented a group of buddies, details of each of these buddies are obtained.

The GLMS provides the required details by way of one or more Send Member Info messages 308. Optionally, the group communication server 204 further requests authorization (message 310) from the GLMS 118 for each of the obtained buddies. Such authorization may be used for checking to see whether each of the obtained buddies is authorised to receive, for example, voice clips. Authorization data may be returned from the GLMS by way of one or more Send Authorization Data messages 312.

When the required buddy details and, if required, authorization data, has been obtained, the group communication server 204 sends the appropriate obtained information to the service 206, (message 314). In the present embodiment, the group communication server 204 provides the voice clip service 206 with suitable address details, such as a SIP URI, of each of the buddies to receive a voice clip, along with an audio representation of the voice clip recorded by the user of the communication device 102.

The service 206 uses the received information to appropriately initiate the required service (message 316). In the present embodiment, the service 206 appropriately sends the recorded voice message to the communication devices of each of the selected buddies.

It can be seen that one advantage of the present embodiment is that the user of the communication device 102 may make use of the PTT interface 106 to access or initiate communications using the service 206, even if there is no PTT service provided by the network 202. This advantageously enables users to benefit from PTT compliant communication devices even if no PTT services currently exist in the network 202. Furthermore, users can make use of new services without requiring a specific client application designed exclusively for use with the new service. In this way, through the use of the existing PTT client applications and interfaces new services can be accessed almost as soon as they are launched, providing significant benefits for users and network and service providers alike.

In this way, a multitude of different communications services may be added to the network 202 and be accessible by the user of a communications device through a conventional PTT interface.

For example, in a further embodiment a service 206 is provided which enables the user of the communication device 102 to establish a conventional telephone conference with a number of users of other communication devices (not shown) in a simple and efficient manner. For example, using the PTT interface 106 the user selects one or more buddies, from his buddy list, with whom he wishes to establish a conference call using the conventional telephony network 110. Additionally, the user also selects a predetermined buddy representing the conferencing service 206. The user initiates the conference through the PTT interface 106 by actuating an appropriate button or performing another suitable action which causes a PTT call setup message (message 302) to be sent to the network 202. The group communication server 204 determines the presence of a buddy in the PTT call setup message which is representative of the service 206. If the presence of such a buddy is determined in the PTT call setup message 302, the group communication server 204 sends a suitable PTT close call message 304 to the communication device 102.

The group communication server 204 is configured to know that the conferencing service 206 requires a telephone subscriber number of each of the buddies included in the PTT call setup message. The group communication server 204 requests and obtains the required information from the GMLS 118 as indicated by messages 306 to 312, as described above.

In an alternative embodiment, the group communication server 204 may obtain this information from the PTT call set up message itself 302 (if this information is contained therein), or through any other appropriate means, such as from SIP address to telephone subscriber number resolution server (not shown).

The group communication server 204 then sends an appropriate message, or messages, 314 to the conferencing service 206 which enables the conferencing service to establish a communication, such as telephone conference call, with each of the required buddies. In this case, it is clear that the PTT interface is used to establish a communication which handled by the interface 104, and not by the PTT interface 106.

In a yet further embodiment, the service 206 provides an information type service, such as an information service providing weather details. In this case, the user of the communication device 102 simply selects a buddy representing the service 106, without selecting or inviting any other buddies. As described above, the user appropriately causes a PTT call setup message 302 to be sent to the group communication server 204.

The group communication server is configured to know the type of information required by the service 206, and obtains this information prior to forwarding this information to the service 206. For example, the service 206 may provide the weather information as textual information in the form of a short message system (SMS) message. In this case, the group communication service obtains the telephone subscriber number of the communication device 102 which the service 206 will use to send the weather information to.

If the service 206 is configured to provide the audio information audibly using the conventional telephony network 110, the group communication server 204 obtains the telephone subscriber number of the communication device 102, as described above, and provides this to the service 206. The service 206 may then use the obtained telephone subscriber number to establish a phone call communication with the communication device 102 and a suitable audio server of the service 206. Alternatively, the service 206 may establish a PTT call or communication with the communication device 102 in the conventional manner.

In yet a further embodiment, the service 206 provides a service which enables the user of the communication device 102 to initiate a communication between two or more other communication devices, but without the user of the communication device 102 becoming a party to the communication. For example, the user of the communication device 102 may desire for buddy A and buddy B to talk to each other, but without the user of the communication device 102 being a party to the communication. In this case, the user of the communication device 102 suitably selects buddy A and buddy B from his buddy list, and additionally selects the buddy representing the service 206. As described above, after initiation of the communication, the service 206 obtains the necessary contact details of buddy A and buddy B, and suitably, for example by way of a conferencing service, establishes a conventional telephone call between each of the selected buddies.

Those skilled in the art will appreciate that although the above embodiments are described primarily with reference to push-to-talk and conventional telephony networks, the inventive concepts described herein are in no way limited thereto.

The invention claimed is:

1. Apparatus, for use in a communication network, comprising:
   a computer having processing logic to:
   receive, from a communication device, a request to initiate a communication using a first communication system, the request including first information relating to one or more parties with which the communication is intended to be initiated;
   determine whether the request includes second information relating to a predetermined party that represents a particular service; and
   in response to determining that the request includes the second information,
   initiating the particular service in accordance with the second information relating to the predetermined party, wherein the processing logic is arranged to initiate the particular service using a second communication system in place of initiating the communication using the first communication system, wherein the second communication system is different from the first communication system, and the first communication system provides a type of service different from a type of the particular service, and
   ending the initiation of the communication using the first communication system.

2. The apparatus of claim 1, wherein the processing logic is arranged to initiate the communication using the second communication system using information included in the request.

3. The apparatus of claim 1, wherein the processing logic is arranged, in response to determining that the request does not include the second information relating to the predetermined party that represents the particular service, to initiate the communication using the first communication system and to not initiate the particular service.

4. The apparatus of claim 1, further comprising a communication server for providing the particular service.

5. The apparatus of claim 4, the processing logic being configured to obtain information required by the communication server and to supply the obtained information to the communication server to enable the communication server to provide the particular service.

6. The apparatus of claim 1, wherein the first communication system is a push-to-talk system.

7. The apparatus of claim 6, wherein the request to initiate the communication using the first communication system is a request to initiate a push-to-talk communication.

8. The apparatus of claim 6, wherein the first information relating to one or more parties includes one or more buddy identifiers.

9. The apparatus of claim 7, wherein the predetermined party is a buddy representing the particular service that is different from the push-to-talk communication.

10. The apparatus of claim 1, wherein the second communication system is a conventional telephony system and wherein the communication using the second communication system is a telephone call using the telephony system.

11. The apparatus of claim 1, wherein the request to initiate the communication using the first communication system is a request for a type of service different from a type of the particular service.

12. The apparatus of claim 11, wherein the request is a request to initiate a push-to-talk (PTT) service using a PTT server, and wherein initiating of the particular service comprises initiating the particular service with a second server different from the PTT server.

13. The apparatus of claim 12, wherein the particular service is one selected from the group consisting of a voice messaging service, a non-PTT telephone conference call, and an information service.

14. A method comprising:
   receiving, from a communication device by a computer, a request to initiate a communication using a first communication system, the request including first information relating to one or more parties with which the communication is intended to be initiated;
   determining, by the computer, whether the request includes second information relating to a predetermined party that represents a particular service; and
   in response to determining that the request includes the second information,
   the computer initiating the particular service in accordance with the second information relating to the predetermined party, wherein the particular service is initiated using a second communication system in place of initiating the communications using the first communication system, wherein the second communication system is different from the first communication system, and the first communication system provides a type of service different from a type of the particular service, and
   sending a response to end the initiation of the communication using the first communication system, while the initiation of the particular service proceeds.

15. The method of claim 14, the initiating of the communication using the second communication system uses information included in the request.

16. The method of claim 14 further comprising, in response to determining that the request does not include the second information relating to a predetermined party that represents the particular service, initiating the communication using the first communication system and not initiating the particular service.

17. The method of claim 14, wherein a communication server is for providing the particular service, the method further comprising obtaining information required by the communication server and supplying the obtained information to the communication server to thereby enable the communication server to provide the particular service.

18. The method of claim 14, adapted for use for where the first communication system is a push-to-talk system.

19. The method of claim 18, wherein the receiving of the request comprises receiving a request to initiate a push-to-talk communication.

20. The method of claim 18, wherein the first information in the request includes one or more buddy identifiers.

21. The method of claim 14, wherein the request to initiate the communication using the first communication system is a request for a type of service different from a type of the particular service.

22. The method of claim 21, wherein the request is a request to initiate a push-to-talk (PTT) service using a PTT server, and wherein initiating of the particular service comprises initiating the particular service with a second server different from the PTT server.

23. The method of claim 22, wherein the particular service is one selected from the group consisting of a voice messaging service, a non-PTT telephone conference call, and an information service.

24. A method, in a communication device having an interface operable for initiating a communication with a first communication system, of activating a network-based service, comprising:
  receiving, through the interface, selection of an identifier of a predetermined party that represents a particular service;
  in response to receiving the selection, the communication device sending, to a server, a request to initiate the communication with the first communication system, the request including the identifier of the predetermined party that represents the particular service,
  wherein the inclusion of the identifier of the predetermined party is to cause the server to initiate the particular service using a second communication system instead of performing the communication with the first communication system, wherein the second communication system is different from the first communication system, and the first communication system provides a type of service different from a type of the particular service, and wherein the inclusion of the identifier of the predetermined party is to cause the server to end the initiation of the communication using the first communication system; and
  the communication device performing communication of the particular service.

25. The method of claim 13, wherein the request is a request for a first type of service that is different from the particular service.

26. A communication device for use with a communication network, the communication device including a processor and an interface configured to:
  receive selection of an identifier of a predetermined party that represents a particular service;
  in response to receiving the selection, send a request to a server to initiate a communication with a first communication system, the request containing the identifier of the predetermined party, wherein the inclusion of the identifier of the predetermined party in the request is to cause the server to activate the particular service using a second communication system instead of the communication with the first communication system, wherein the second communication system is different from the first communication system, and the first communication system provides a type of service different from a type of the particular service, and wherein the inclusion of the identifier of the predetermined party is to cause the server to end the initiation of the communication using the first communication system; and
  perform communication of the particular service.

27. The communication device of claim 26, wherein the request is a request for a first type of service that is different from the particular service.

* * * * *

UNITED STATES PATENT AND TRADEMARK OFFICE
CERTIFICATE OF CORRECTION

PATENT NO.        : 8,244,252 B2                                   Page 1 of 1
APPLICATION NO.   : 11/722843
DATED             : August 14, 2012
INVENTOR(S)       : Pierre-Yves Descombes It is certified that error appears in the above-identified patent and that said Letters Patent is hereby corrected as shown below:

In the Claims:

In column 12, line 15, in Claim 25, delete "claim 13," and insert -- claim 24, --, therefor.

Signed and Sealed this
Fourth Day of June, 2013

Teresa Stanek Rea
*Acting Director of the United States Patent and Trademark Office*